US012297738B1

(12) United States Patent
Plamondon et al.

(10) Patent No.: US 12,297,738 B1
(45) Date of Patent: May 13, 2025

(54) ROTARY ENGINE AND COOLING SYSTEMS THEREOF

(71) Applicant: PRATT & WHITNEY CANADA CORP., Longueuil (CA)

(72) Inventors: Etienne Plamondon, Candiac (CA); Thomas Trevor Ricci, Pointe-Claire (CA); Jeremie Barberger, Montreal (CA); Michel Bousquet, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/406,652

(22) Filed: Jan. 8, 2024

(51) Int. Cl.
*F01C 21/06* (2006.01)
*F01C 1/22* (2006.01)
*F02B 53/00* (2006.01)
*F02B 55/10* (2006.01)

(52) U.S. Cl.
CPC ................ *F01C 21/06* (2013.01); *F01C 1/22* (2013.01); *F02B 55/10* (2013.01); *F02B 2053/005* (2013.01)

(58) Field of Classification Search
CPC .... F02B 55/10; F02B 2053/005; F01C 21/06; F01C 1/22
USPC ............... 123/18 A, 18 R, 43 A, 45 A, 45 R, 123/200–249; 418/140, 187, 61.1
See application file for complete search history.

(56) References Cited

U.S. PATENT DOCUMENTS

| | | | | |
|---|---|---|---|---|
| 3,313,276 A | | 4/1967 | Ryusuke | |
| 3,964,445 A | * | 6/1976 | Ernest | F02B 55/10 418/83 |
| 4,035,112 A | | 7/1977 | Hackbarth | |
| 4,037,999 A | * | 7/1977 | Armin | F02B 55/04 418/91 |
| 4,218,200 A | | 8/1980 | Morita | |
| 4,531,900 A | | 7/1985 | Jones | |
| 4,691,668 A | * | 9/1987 | West | F01P 7/164 123/41.12 |
| 6,866,092 B1 | | 3/2005 | Molivadas | |
| 9,376,957 B2 | | 6/2016 | Hughston | |

(Continued)

FOREIGN PATENT DOCUMENTS

CA 1044144 A 12/1978

*Primary Examiner* — J. Todd Newton
(74) *Attorney, Agent, or Firm* — NORTON ROSE FULBRIGHT CANADA LLP

(57) ABSTRACT

A rotary engine, comprising: housings defining a rotor cavity and respective coolant passages fluidly connected in parallel to a source of coolant; a rotor within the rotor cavity; and a cooling system including: a flow regulating device in fluid communication with the respective coolant passages; a heat exchanger facilitating heat exchange between the coolant and a heat-transfer medium; and a controller operatively connected to the flow regulating device to: determine, based on an engine parameter and an environment parameter of the rotary engine, a flow rate of the coolant to be injected towards the respective coolant passages to maintain the housings within a temperature range, the engine parameter indicative of a quantity of heat generated by the rotary engine, the environment parameter indicative of a quantity of heat the heat exchanger is able to transfer to the heat-transfer medium; and cause the coolant to flow towards at the flow rate.

20 Claims, 10 Drawing Sheets

(56) References Cited

U.S. PATENT DOCUMENTS

| | | | | |
|---|---|---|---|---|
| 10,190,478 | B1 * | 1/2019 | Giraudo | F01P 7/165 |
| 2003/0098077 | A1 * | 5/2003 | McLane | F16K 11/0856 137/625.47 |
| 2005/0034688 | A1 * | 2/2005 | Lelkes | F16K 11/074 123/41.01 |
| 2012/0152185 | A1 * | 6/2012 | Lemke | F02B 75/282 123/41.02 |
| 2014/0007824 | A1 * | 1/2014 | Hayashi | F01P 7/167 123/41.01 |
| 2017/0138248 | A1 * | 5/2017 | Lee | F01P 7/165 |
| 2019/0010858 | A1 * | 1/2019 | Di Lorenzo | F01P 7/165 |
| 2019/0024569 | A1 * | 1/2019 | Di Lorenzo | F01P 7/167 |
| 2019/0032539 | A1 * | 1/2019 | Di Lorenzo | F01P 7/165 |
| 2019/0032542 | A1 * | 1/2019 | Scavone | F01P 3/02 |

* cited by examiner

500

503 501 502

| Output | Inputs | |
|---|---|---|
| Flow rate data | Engine parameter data | Environment parameter data |
| Value 1 | Value 2 | Value 3 |
| Value 4 | Value 5 | Value 6 |
| ... | ... | ... |
| Value X | Value Y | Value Z |

FIG. 5

ROTARY ENGINE AND COOLING SYSTEMS THEREOF

TECHNICAL FIELD

The application relates generally to internal combustion engines and, more particularly, to rotary internal combustion engines and to cooling systems of such engines.

BACKGROUND

Combustion chambers of a rotary engine, such as a Wankel engine, are delimited radially by the rotor and rotor housing and axially by a side housing. The side housing faces the combustion chambers and is thus subjected to high pressure and thermal loads. On the other hand, the side housing provides the running surface for the rotor's side seals. During use, the rotor housing becomes hot and requires cooling. Existing cooling systems may require intricate sealing arrangements between adjacent rotor and side housings to prevent leakage. Continuous improvements are sought.

SUMMARY

In one aspect, there is provided a rotary engine, comprising: housings secured to one another and conjointly defining a rotor cavity, the housings defining respective coolant passages fluidly connected in parallel to a source of coolant; a rotor rotationally received within the rotor cavity; and a cooling system including: a flow regulating device in fluid communication with the respective coolant passages; a heat exchanger facilitating heat exchange between the coolant and a heat-transfer medium; and a controller operatively connected to the flow regulating device, the controller having a processing unit operatively connected to a computer-readable medium having instructions stored thereon and executable by the processing unit to: determine, based on an engine parameter and an environment parameter of the rotary engine, a flow rate of the coolant to be injected towards the respective coolant passages to maintain the housings within a temperature range, the engine parameter indicative of a quantity of heat generated by the rotary engine, the environment parameter indicative of a quantity of heat the heat exchanger is able to transfer to the heat-transfer medium; and cause the coolant to flow towards the respective coolant passages at the flow rate.

The rotary engine described above may include any of the following features, in any combinations.

In some embodiments, the engine parameter is one or more of a torque generated by the rotary engine, a power generated by the rotary engine, a rotational speed of the rotor of the rotary engine, and a flow rate of fuel injected in a combustion chamber of the rotary engine.

In some embodiments, the environment parameter is one or more of a pressure of air in an environment outside the rotary engine, a humidity of the air, a temperature of the air, a speed of travel of an aircraft equipped with the rotary engine, and a temperature of a lubricant exiting the housings of the rotary engine.

In some embodiments, the flow regulating device is a pump, the computer-readable medium has the instructions executable by the processing unit to inject the flow of the coolant towards the respective coolant passages by varying a rotational speed of the pump.

In some embodiments, the flow regulating device is a valve, the computer-readable medium has the instructions executable by the processing unit to inject the flow of the coolant towards the respective coolant passages by changing a flow circulating area of the valve.

In some embodiments, the computer-readable medium has the instructions executable by the processing unit to determine the flow rate of the coolant by determining the flow rate from a lookup table comprising flow rate data as a function of engine parameter data and environment data.

In some embodiments, the computer-readable medium has the instructions executable by the processing unit to determine the flow rate of the coolant by: feeding the engine parameter and the environment parameter into a digital twin of the rotary engine, the digital twin comprising a model of the rotary engine; and computing, with the digital twin, the flow rate of the rotary engine.

In some embodiments, a fixed orifice is in fluid communication with one of the respective coolant passages, the fixed orifice having a flow circulating area selected for decreasing a local flow rate of the coolant flowing through the one of the respective coolant passages, the one of the respective coolant passages being associated with one of the housings having a cooling requirement lower than an average of cooling requirements of the housings.

In some embodiments, flow paths extend through the housings, the flow paths including a first flow path extending within a first side housing coolant passage of a first side housing of the housings, a second flow path extending within a second side housing coolant passage of a second side housing of the housings, and a third flow path extending within a rotor housing coolant passage of a rotor housing of the housings, the flow paths free from intersection with one another.

In some embodiments, the flow paths are free from intersection with mounting interfaces between the housings.

In another aspect, there is provided a method for mitigating heat generated by a rotary engine, the rotary engine having housings defining respective coolant passages for flowing a coolant, the coolant in heat exchange relationship with a heat-transfer medium via a heat-exchanger, the method comprising: determining, based on an engine parameter and an environment parameter of the rotary engine, a flow rate of the coolant to be injected towards the respective coolant passages to maintain the housings within a temperature range, the engine parameter indicative of a quantity of heat generated by the rotary engine, the environment parameter indicative of a quantity of heat the heat exchanger is able to transfer to the heat-transfer medium; and causing the coolant to flow towards the respective coolant passages at the flow rate.

The method described above may include any of the following features, in any combinations.

In some embodiments, the determining of the flow rate of the coolant based on the engine parameter includes determining the flow rate of the coolant based on one or more of a torque generated by the rotary engine, a power generated by the rotary engine, a rotational speed of a rotor of the rotary engine, and a flow rate of fuel injected in a combustion chamber of the rotary engine.

In some embodiments, the determining of the flow rate of the coolant based on the environment parameter includes determining the flow rate of the coolant based on one or more of a pressure of air in an environment outside the rotary engine, a humidity of the air, a temperature of the air, a speed of travel of an aircraft equipped with the rotary engine, and a temperature of a lubricant exiting the housings of the rotary engine In some embodiments, the causing of the coolant to flow towards the respective coolant passages includes varying a rotational speed of a pump driving the flow of the coolant.

In some embodiments, the causing of the coolant to flow towards the respective coolant passages includes changing a flow circulating area of a valve being in fluid flow communication with the respective coolant passages.

In some embodiments, the changing of the flow circulating area includes changing the flow circulating area of a single valve being in fluid communication with each of the respective coolant passages.

In some embodiments, the changing of the flow circulating area includes changing the flow circulating area of a plurality of valves each being in fluid communication with a respective one of the respective coolant passages.

In some embodiments, the determining of the flow rate of the coolant includes determining the flow rate from a lookup table comprising flow rate data as a function of engine parameter data and environment data.

In some embodiments, the determining of the flow rate of the coolant includes: feeding the engine parameter and the environment parameter into a digital twin of the rotary engine, the digital twin comprising a model of the rotary engine; and computing, with the digital twin, the flow rate of the coolant.

In some embodiments, before the determining of the flow rate of the coolant, the method includes determining a coolant distribution scheme, wherein the causing the coolant to flow towards the respective coolant passages at the flow rate includes dividing the flow rate of the coolant between the housings per the coolant distribution scheme such that a greater portion of the flow rate of the coolant flows through to a subset of the housings having a greater cooling need than a remainder of the housings.

BRIEF DESCRIPTION OF THE DRAWINGS

Reference is now made to the accompanying figures in which:

FIG. 5 is a lookup table correlating flow rate data with engine parameter data and environment data;

DETAILED DESCRIPTION

Figure 1A:
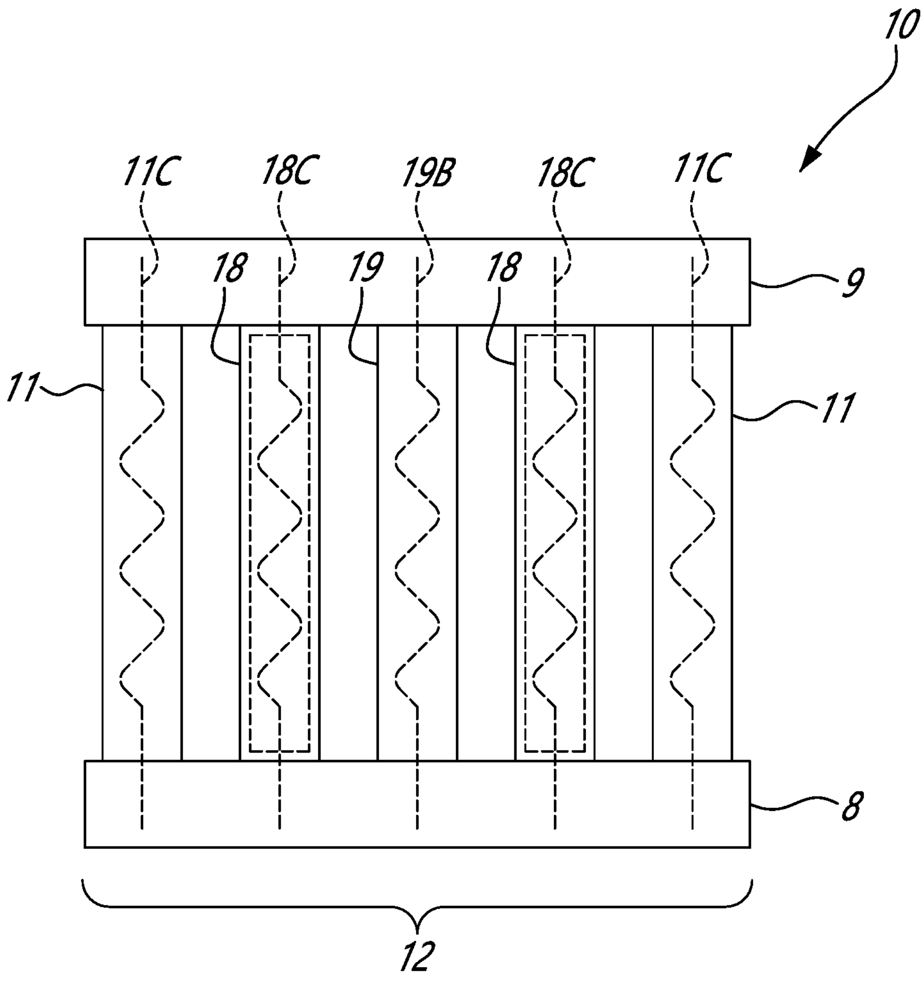
FIG. 1A is a schematic side assembly view of a rotary internal combustion engine in accordance with one embodiment.
Figure 1B:
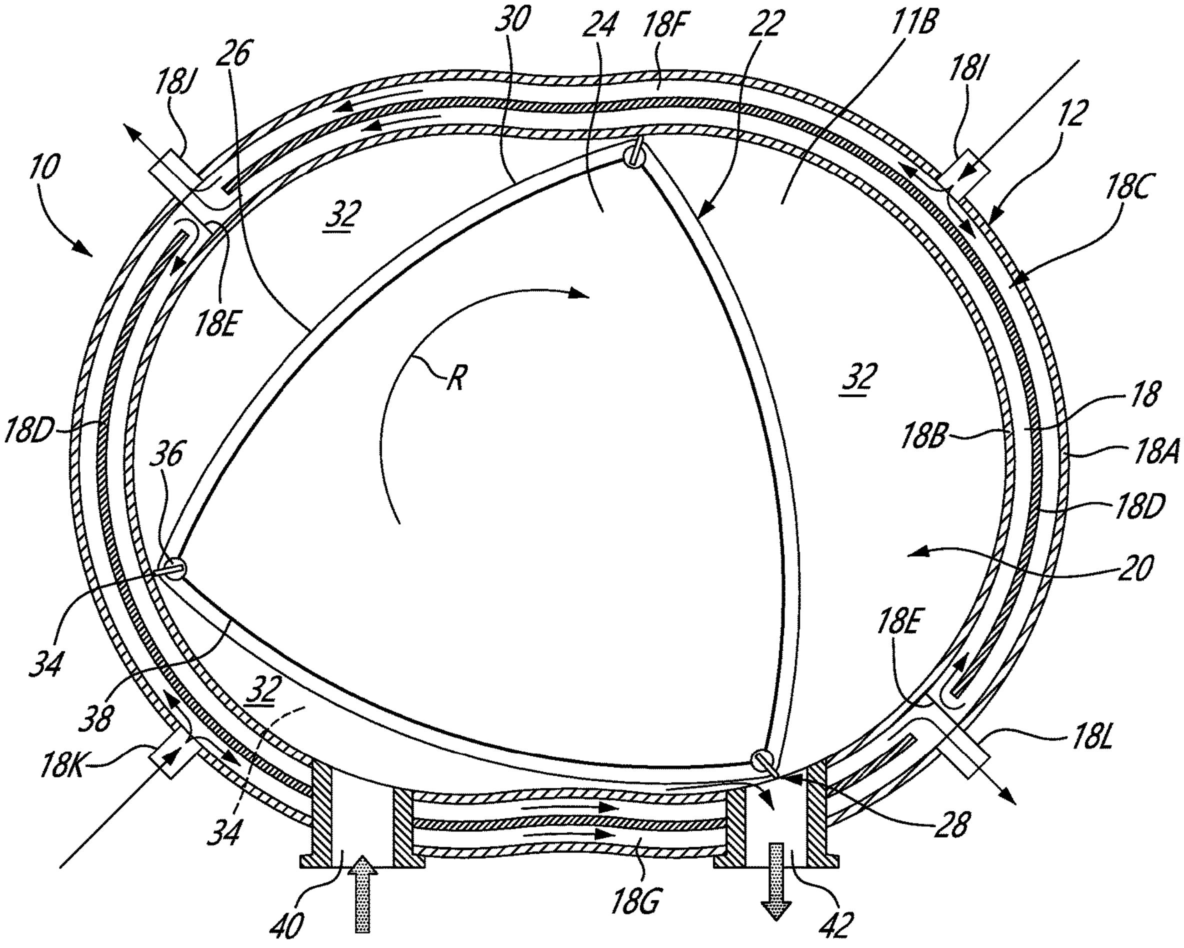
FIG. 1B is a schematic cross-sectional view of a rotor housing in accordance with one embodiment to be used with the rotary internal combustion engine of FIG. 1A.

Referring now to FIG. 1A, a motor assembly including a plurality of power modules each being operable to generate a force (e.g., torque) is shown. The power modules may be thermal engine modules, electric power modules, and any combinations of the above. In the depicted embodiment, the motor assembly includes a plurality of thermal engine modules that are each rotary engines. Hence, the motor assembly of the present disclosure corresponds to a multi-rotor internal combustion engine, referred to below simply as a rotary engine 10. The thermal engine modules may be, alternatively, piston engine or any kind of reciprocating internal combustion engine having at least one combustion chamber of varying volume. The rotary engine 10 is depicted in FIG. 1A as including two rotors (e.g., illustrated as housed in rotor housings 18), but may include more than two rotors or only one rotor in alternate embodiments. Each of the rotors and respective housings enclosing the rotors may be considered a power module. Hence, in FIG. 1A, the rotary engine 10 includes two power modules, but more or less may be used. The rotary engine 10 may be a Wankel engine. The rotary engine 10 comprises an outer body also referred to as a housing assembly 12 including a stack of housings. The stack of housings includes axially-spaced side housings 11, which each may include a side wall 11A (FIG. 1C) and a side plate 11B (FIG. 1B) mounted to the side wall 11A, with a rotor housing 18 extending from one of the side housings 11 to the other (for a single rotor engine), to form a rotor cavity 20 (FIG. 1B). The side plate 11B may define the face against which the rotor rides during use whereas the side wall 11A may be used to hold the side plate 11B and is mounted to the rotor housing 18. More detail about this configuration may be found in U.S. patent application Ser. No. 18/054,701, the entire contends of which are incorporated by reference herein. In some alternate embodiments, the side housings 11 include solely the side wall, that is, the side wall and the side plate may be combined into a single element.

In the depicted embodiment of FIG. 1A, the housing assembly 12 further includes an intermediate housing 19 and the rotor housing 18 includes two rotor housings. Each of the rotor housings 18 is disposed between a respective one of the side housings 11 and the intermediate housing 19. Put differently, the rotor housing 18 includes a first rotor housing and a second rotor housing. The first rotor housing is disposed between a first one of the side housings 11 and the intermediate housing 19. The second rotor housing disposed between a second one of the side housings 11 and the intermediate housing 19. Regardless of a number of rotors, the rotary engine includes only two side housings 11 disposed at opposite ends of the engine. A number of the intermediate housing 19 equals a number of the rotor minus 1 (e.g., one intermediate housing for a two-rotor engine, two intermediate housings for a three-rotor engine, and so on). The different housings are clamped in sandwich.

Figure 1C:
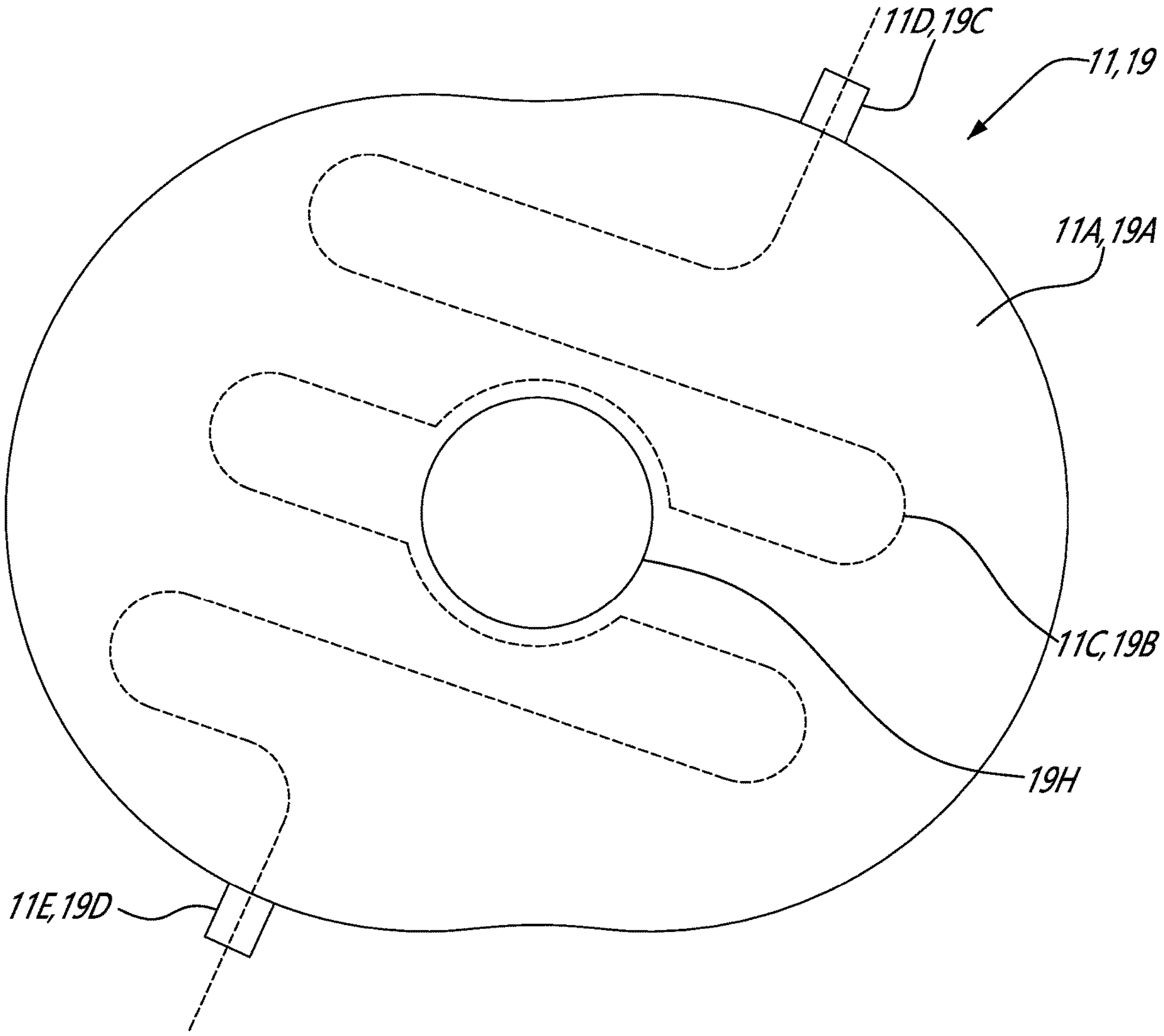
FIG. 1C is a schematic cross-sectional view of a side housing or of an intermediate housing in accordance with one embodiment to be used with the rotary internal combustion engine of FIG. 1A.
Figure 2:
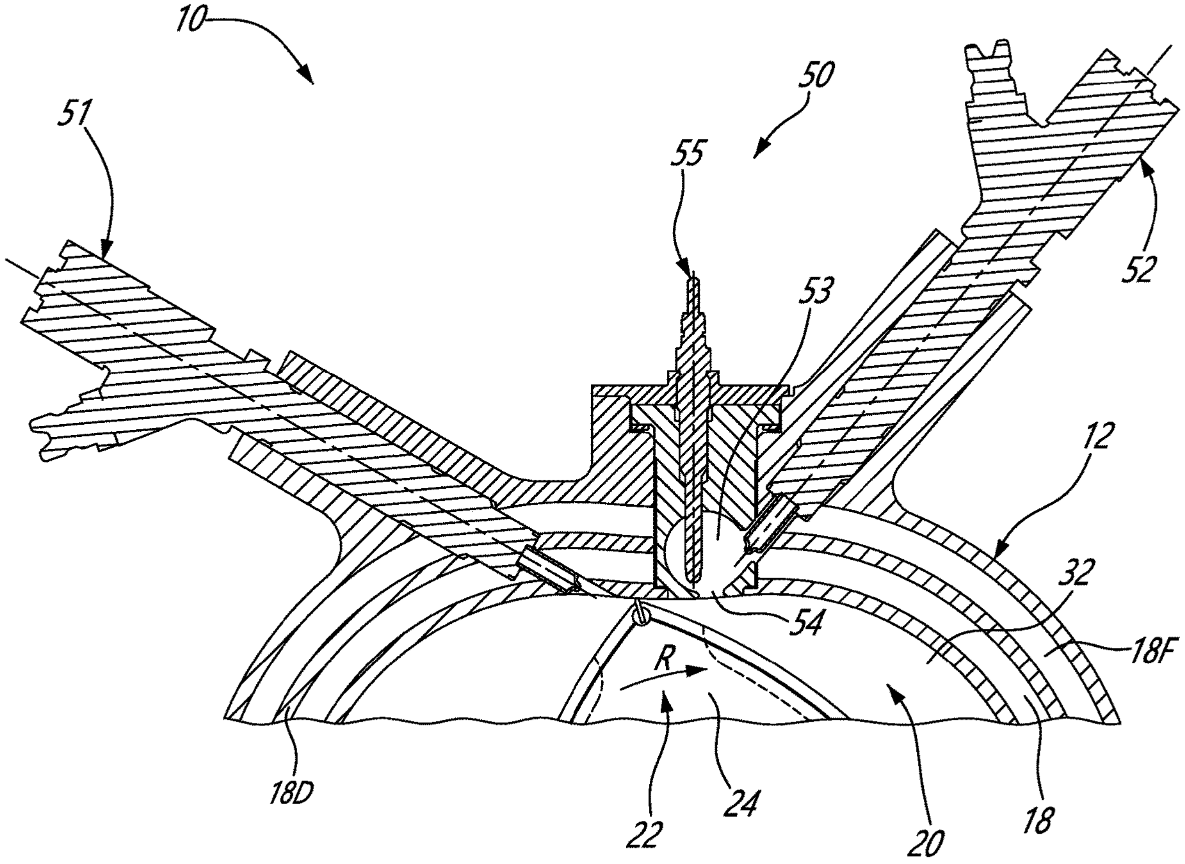
FIG. 2 is a cross-sectional view of a portion of the rotor housing of FIG. 1B for the rotary internal combustion engine of FIG. 1A illustrating a pilot subchamber and an injection system thereof.

The side housings 11, the intermediate housing 19, and the rotor housings 18 conjointly define rotor cavities 20 (FIG. 2) each receiving a respective rotor 22 (FIG. 2). The intermediate housing 19 therefore defines opposite axial end faces that are each engaged by a respective one of the rotors 22. The intermediate housing 19 may include an intermediate wall 19A (FIG. 1C) and two intermediate plates secured on opposite sides of the intermediate wall. The intermediate plates may define the faces against which the rotors ride during use. The intermediate wall 19A is secured to the rotor housings disposed on opposite sides thereof.

Still referring to FIG. 1A, the rotor housings 18 have each a first side and a second side opposite to the first side. The side housings 11 include a first side housing secured to the first side of a first one of the rotor housings 18 and a second side housing secured to the second side of a second one of the rotor housings 18. The rotor cavities 20 are defined axially between the side housings 11 and the intermediate housing 19 and circumscribed by the rotor housings 18.

Referring now to FIG. 1B, the rotor housing 18 and rotor 22 are described in greater detail. The rotor housing 18 has an inner surface having a profile defining two lobes, which may be an epitrochoid. An inner body or rotor 22 is received within one of the rotor cavities 20. The rotor 22 has axially spaced end faces 24 adjacent to the side walls 14, and a peripheral face 26 extending there between. The peripheral face 26 defines three circumferentially-spaced apex portions 28, and a generally triangular profile with outwardly arched sides 30. The apex portions 28 are in sealing engagement with the inner surface of rotor housing 18 to form three rotating combustion chambers 32 between the rotor 22 and housing assembly 12. The combustion chambers 32 vary in volume with rotation of the rotor 22 within the housing assembly 12. The geometrical axis of the rotor 22 is offset from and parallel to the axis of the housing assembly 12. In some embodiments, more or less than three rotating combustion chambers may be provided with other shapes of the rotor 22.

The combustion chambers 32 are sealed. In the embodiment shown, each rotor apex portion 28 has an apex seal 34 extending from one end face 24 to the other and biased radially outwardly against the rotor housing 18. An end seal 36 engages each end of each apex seal 34 and is biased against the respective side housing 11. Each end face 24 of the rotor 22 has at least one arc-shaped face seal 38 running from each apex portion 28 to each adjacent apex portion 28, adjacent to but inwardly of the rotor periphery throughout its length, in sealing engagement with the end seal 36 adjacent each end thereof and biased into sealing engagement with the adjacent side housings 11. Alternate sealing arrangements are also possible.

Although not shown in the Figures, the rotor 22 is journaled on an eccentric portion of a shaft such that the shaft rotates the rotor 22 to perform orbital revolutions within the rotor cavity 20. The shaft may rotate three times for each complete rotation of the rotor 22 as it moves around the rotor cavity 20. Oil seals are provided around the eccentric to impede leakage flow of lubricating oil radially outwardly thereof between the respective rotor end face 24 and side housings 11. During each rotation of the rotor 22, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 42 In the embodiment shown, the ports 40, 42 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g., spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 42.

Referring to FIG. 2, the rotary engine 10 includes a fuel injection system 50 having a main injector 51 and a pilot injector 52. The rotor housing 18 defines a pilot subchamber 53, which may be provided in an insert or defined directly by the rotor housing 18. The pilot subchamber 53 is located radially outwardly of an inner face of the rotor housing 18 against which the rotor 22 rides during use. The pilot subchamber 53 is in communication with the rotor cavity 20. In the embodiment shown, the pilot subchamber 53 has a circular cross-section; alternate shapes are also possible and contemplated within this disclosure. The pilot subchamber 53 communicates with the rotor cavity 20 through at least one opening or outlet 54, and has a shape forming a reduced cross-section adjacent the opening outlet 54, such that the outlet 54 defines a restriction to the flow between the pilot subchamber 53 and the rotor cavity 20. The outlet 54 may have various shapes and/or be defined by multiple holes. An igniter 55 may have its tip located within the pilot subchamber 53 to ignite a mixture of fuel and air received therein. Understandably, this section of the rotor housing 18 may become hotter than a remainder of the rotor housing since the combustion of the fuel received into the pilot subchamber 53 via the pilot injector 52 will generate heat. Moreover, the combustion of the fuel received into the main chamber 32 independently of the pilot subchamber 53 via the main injector 51 will also generate heat. This may, in turn, cause a non-uniformity of the heat distribution in the rotor housing 18. In some alternate embodiments, the pilot subchamber 53 may be omitted.

Typically, rotary engines are cooled by coolant passages that extend from one housing to the next in an axial direction relative to an axis of rotation of a shaft driven by the rotors. This may require complex sealing arrangements between the different housings (e.g., side housings 11, rotor housings 18, intermediate housings 19). Moreover, the side housing 11 located at the end of the loop is less cooled since the coolant has already picked up heat from the upstream housings. Moreover, in some configurations, it may be desired to vary the quantity of coolant flown in the coolant passage to increase or decrease the cooling of the housing(s). The cooling systems disclosed below may at least partially alleviate these drawbacks.

Referring back to FIG. 1B, the rotor housing 18 has an outer wall 18A and an inner wall 18B spaced apart from the outer wall 18A to define a rotor housing coolant passage 18C therebetween. The rotor housing coolant passage 18C extends through the rotor housing 18. The rotor housing coolant passage 18C extends at least partially around the rotor 22 and around the rotor cavity 20 and may extend fully around the rotor 22 and rotor cavity 20. Both of the outer wall 18A and the inner wall 18B extend around the rotor cavity 20 and extend axially from one of the side housing to the other. The inner wall 18B defines an inner face against which the rotor rides during use. The rotor housing 18 may include peripheral inner walls 18D and radial inner walls 18E to divide the rotor housing coolant passage 18C in two or more sections. In the embodiment shown, the rotor housing coolant passage 18C includes a first section 18F and a second section 18G spaced apart from the first section 18F.

The two sections may be circumferentially and/or radially offset from one another. The rotor housing coolant passage 18C includes a peripheral coolant inlet 181 and a peripheral coolant outlet 18J. It may include a secondary peripheral coolant inlet 18K and a secondary peripheral coolant outlet 18L when the rotor housing coolant passage 18C has two sections as disclosed herein. It will be appreciated that the rotor housing 18 may define a coolant port, a coolant inlet, and a coolant outlet; the coolant port being either an inlet or an outlet. In such an embodiment, the first section fluidly connects the coolant inlet to the coolant port and the second section fluidly connects the coolant outlet to the coolant port. Hence, only one coolant inlet and two coolant outlets, or only one coolant outlet and two coolant inlets may be provided. Any suitable configurations and any number of coolant sections are contemplated.

Referring now to FIG. 1C, the side housing 11, and more particularly the side wall 11A is shown. The side wall 11A is located at an end of the rotary engine 10 and is secured to the rotor housing 18. In the depicted embodiment, the side wall 11A defines a side housing coolant passage 11C extending from a side housing coolant passage inlet 11D to a side housing coolant passage outlet 11E. The side housing coolant passage 11C may extend around a plurality of internal walls such as to have a tortuous shape to maximize heat transfer from the side wall 11A to the coolant. The side housing 11 and intermediate housing 19 define a central hole 19H for receiving a shaft of the rotary engine 10.

Still referring to FIG. 1C, a similar configuration is provided for the intermediate housing 19 in which the intermediate wall 19A has an intermediate housing coolant passage 19B extending from an intermediate housing coolant passage inlet 19C to an intermediate housing coolant passage outlet 19D. A similar tortuous shape may be provided to maximize heat transfer to the coolant.

Referring back to FIG. 1A, in the embodiment shown, the side housing coolant passages 11C, the intermediate housing coolant passage 19B, and the rotor housing coolant passages 18C are fluidly separated from one another and are free of a seal between the intermediate housing 19 and the rotor housings 18 and between the rotor housings 18 and the side housings 11. In the presented embodiment, a parallel flow coolant circuit is defined by the housing assembly 12 and is operable to individually cool the different housings (e.g., side housings 11, rotor housings 18, intermediate housing(s) 19). The expression "parallel" in the context of the present disclosure implies that each of the housings is simultaneously cooled via a dedicated flow of coolant. This dedicated flow of coolant, once it enters one of the housings, is not shared with the other housings. This is contrary to a configuration in "series" where the same flow of coolant cools each of the housings, one after the other. A configuration in series may cause the coolant to pick up less and less heat as it flows through the different housings since its temperature increases as it flows through the different housings. In contrast, a configuration in parallel may enable greater heat transfer as will be described below.

More specifically, each of the side housing coolant passages 11C, the intermediate housing coolant passage 19B, and the rotor housing coolant passages 18C are fluidly independent and separated from one another as these coolant passages extend within the intermediate housing 19, the rotor housings 18, and the side housings 11. Thus, the coolant passages are free of inter-passage connection between the housings. Inter-passage connection corresponds to fluid connection from one of the housing to the other either via external conduits or via ports defined by the housings at the mounting interfaces. Hence, coolant that enters one of the side housings 11, the rotor housing 18, and the intermediate housing 19 exits the same one of the side housings 11, the rotor housing 18, and the intermediate housing 19. As discussed above, each of the side housings 11, the rotor housing 18, and the intermediate housing 19 has a respective dedicated inlet and a respective dedicated outlet. Thus, the coolant flows in parallel within each of the side housings 11, the rotor housing 18, and the intermediate housing 19 along respective flow paths from a respective inlet to a respective outlet without intersection between these flow paths. Therefore, a first coolant flow path extends solely within the first side housing, a second coolant flow path extends solely within the second side housing, and the rotor housing coolant flow path extends solely within the rotor housing. When an intermediate housing is used, an intermediate flow path extends solely within the intermediate housing. The coolant passages are therefore free from intersection with the mounting interfaces defined between the different housings. Put differently, there is no coolant flow connection across the housings.

It will be appreciated that, in some embodiments, the rotary engine 10 may not require three-piece housings. Hence, the rotary engine 10 includes at least one flow path per housing; the flow paths of different housings are free from interconnection from one another. In other words, the flow path(s) of each housing are fluidly independent from one another.

Consequently, there may be no sharing of coolant between the different housings. Each of the housings have dedicated inlets and outlets and the coolant passages of these housings are free of intersection with mounting interfaces defined between these housings. These mounting interfaces correspond to mating faces of the different housings. In other words, the side housing coolant passage 11C extends along a flow path that is free from intersection with an interface between the side housing 11 and the rotor housing 18. The rotor housing coolant passage 18C extends along a flow path that is free from intersection with an interface between the rotor housing 18 and the side housing 11 and free from intersection with an interface between the rotor housing 18 and the intermediate housing 19. The intermediate housing coolant passage 19B extends along a flow path that is free from intersection with interfaces between the intermediate housing 19 and both of the rotor housings 18 located on opposite sides thereof. The interfaces between the housings are free of coolant seal. A coolant seal is a seal (e.g., elastomeric member) used for preventing coolant leakage. A lubricant seal or a combustion gas seal may be disposed at interfaces between the housings to prevent leakage of lubricant or combustion gases, but there may be no seal used for preventing leakage of coolant at the interfaces between the housings. The configuration of the distinct fluidly independent coolant passages may render obsolete the use of coolant seal between the housings.

Still referring to FIG. 1A, the rotary engine 10 may include a fluid supply manifold 8 and a fluid outlet manifold 9. The fluid supply manifold 8 is used to receive a coolant from a source of coolant and to distributed this coolant between the different coolant passages 11C, 19B, 18C of the housings 11, 18, 19 of the rotary engine 10. The fluid outlet manifold 9 is used to receive the coolant from the different coolant passages and to flow the coolant back towards the source of coolant. As shown in FIG. 1A, a plurality of fluid conduits fluidly connect the fluid supply manifold 8 to the fluid outlet manifold 9. The plurality of fluid conduits are fluidly connect the fluid supply manifold 8 to the fluid outlet manifold 9 and are free from fluid interconnections fluidly between the fluid supply manifold 8 and the fluid outlet manifold 9. Each fluid conduit of the plurality of fluid conduits is defined in part by a power module of the plurality of power modules. These fluid conduits include the coolant passages 11C, 19B, 18C. The fluid conduits are free from fluid interconnections fluidly between the fluid supply manifold and the fluid outlet manifold. In the context of the present disclosure, a fluid conduit that connects a first component to a second component implies any combination of elements that convey a fluid from the first component to the second component, and is suitable for its stated purpose. For example, a fluid conduit connecting the first component to the second component may include any one or a combination of any one or more of: a filter, a pump, a valve, a pipe, a hose, a bore through a part of an engine block, etc. In the case of an electric power module, a coolant passage may extend within a housing of an electric motor.

In some embodiments, it may be desired to maintain the different housings of the rotary engine 10, namely the end housings, the intermediate housing(s), and the rotor housing (s), within a given temperature range for optimal operation of the rotary engine 10. However, the rotary engine 10 may be operated at a plurality of power levels (e.g., low power, cruise power, take-off power, taxi, etc.). At each of those levels, the rotary engine 10 will generate a different quantity of heat since a flow rate of fuel injected in the combustion chambers varies. With more fuel, there is more heat generated by the rotary engine and, consequently, more heat to be dissipated to an environment outside the rotary engine 10. A flow rate of a coolant may therefore be increased when the engine is operated at a power level generating more heat. Also, environmental conditions, such as pressure, temperature, and so on, affect a quantity of heat that may be dissipated to ambient air. More specifically, during a cold day, there is a greater temperature difference between the coolant and the ambient air permitting a high heat flux between these two fluids. However, during a hot day, this temperature difference is expected to decrease. This may reduce the heat flux between the coolant and the ambient air. Hence, a flow rate of the coolant may be increased to compensate.

Figure 3:
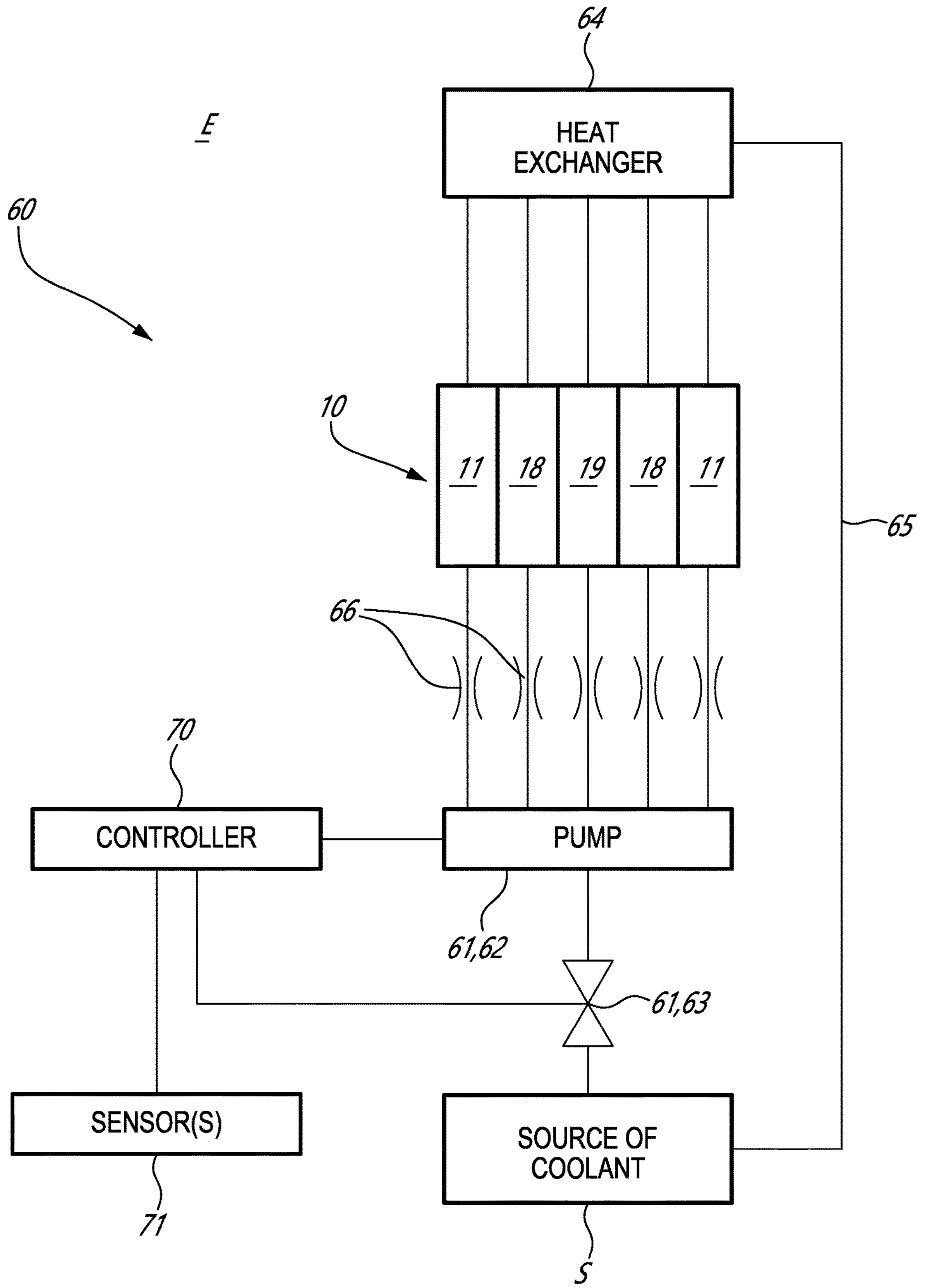
FIG. 3 is a schematic view of a rotary engine and cooling system thereof in accordance with one embodiment.

Referring now to FIG. 3, a cooling system for the rotary engine 10 of FIGS. 1A and 1*n* accordance with one embodiment is shown at 60. The cooling system 60 may be able to fine tune the flow rate of coolant supplied to the different coolant passages of the different housings of the rotary engine 10.

As shown in FIG. 3, the cooling system 60 includes a flow regulating device 61. The flow regulating device may include, in a first embodiment, a pump 62 configured for driving a flow of the coolant through the respective coolant passages of the housings of the rotary engine 10. The pump 62 may be a gear pump, a centrifugal pump, a reciprocating pump, a diaphragm pump, a vane pump, a screw pump, a peristaltic pump, a jet pump, an axial flow pump, a piston pump, a peripheral pump, or any suitable kind of pumps. The pump 62 has an inlet fluidly connected to a source of the coolant S and an outlet fluidly connected to the coolant passages. It will be appreciated that, instead of being located upstream of the housings (e.g., housings 11, 18, 19), the pump 62 may alternatively be located downstream of these housings. More than one pump may be used in some embodiments.

In a second embodiment, the flow regulating device 61 may be a valve 63 in fluid communication with the coolant passages. The valve 63 may define a plurality of positions each defining a respective flow circulating area. The valve 63 may be a ball valve, a gate valve, or any other suitable kind of valve.

Hence, a flow rate of the coolant flowing from the source of coolant S to the coolant passages of the housings of the rotary engine 10 may be adjusted with the flow regulating device 61, which may include the pump 62, the valve 63 or a combination of the pump 62 and the valve 63. For instance, the pump 62 may be driven by a dedicated motor (e.g., electric motor) controlled by a controller such that a rotational speed of the pump 62 may be controlled independently of a rotational speed of a crankshaft of the rotary engine 10. Hence, the flow rate of the coolant may be adjusted by adjusting a rotational speed of the pump 62.

However, in some embodiments, the pump 62 may be drivingly engaged by the crankshaft of the rotary engine 10, either directly or via suitable gearing. In such a case, the pump 62 may not be controlled to vary the flow rate of the coolant. In such a case, the valve 63 may be used for this purpose. The valve 63 may have a valve member engaged by an actuator (e.g., solenoid, pneumatic actuator, hydraulic actuator, linear actuator, etc.), which may be controlled to select a desired position of the valve member to regulate the flow rate of the coolant to a desired flow rate.

The coolant, after its passing through the different coolant passages of the rotary engine 10, has increased in temperature since it picked up heat from the housings. This heat may be dissipated to a heat-transfer medium, which may be air of an environment E outside the rotary engine 10. In the depicted embodiment, a heat exchanger 64 is used for facilitating heat exchange between the coolant and the heat-transfer medium. The heat-transfer medium may be air, or any other fluid used by the rotary engine 10, or by an aircraft equipped with the rotary engine 10. The heat-transfer medium may be oil, fuel, and so on. Heat may be transferred from the coolant to the heat-transfer medium and from this heat-transfer medium to the ambient air of the environment E. In the case where the heat-transfer medium is the air, the heat may be transferred directly to the air without using an intermediate medium. A return line 65 flows the coolant exiting the heat exchanger 64 back to the source of coolant S, which may be a coolant reservoir.

The heat exchanger 64 may be any suitable heat exchanger and defines at least one first conduit fluidly connected to the coolant passages of the rotary engine 10 and at least one second conduit fluidly connected to the heat-transfer medium. The at least one fluid conduit and the at least one second conduit are in heat exchange relationship with one another.

The cooling system 60 further includes a controller 70 operatively connected to the flow regulating device 61, be it the pump 62, the valve 63 or a combination of the pump 62 and the valve 63. The controller 70 is configured to compute a plurality of parameters to output an optimal flow rate of the coolant such that the housings are adequately cooled. Indeed, too much cooling may bring the temperature of the housings below a first threshold, which may be detrimental to the performance of the rotary engine 10. Also, too little cooling may bring the temperature of the housings above a second threshold greater than the first threshold, which may also be detrimental to the performance and detrimental to some components of the rotary engine 10 (e.g., seals).

The rotary engine 10 may be operated at a plurality of power levels, as explained above. The power levels indicate to the controller 70 an amount of heat generated by the rotary engine 10. Also, conditions in which the rotary engine 10 is operated, such as a temperature of the environment E, indicate to the controller 70 an amount of heat the heat exchanger 64 is able to dissipate to the heat-transfer medium. At least these two parameters are used to compute the optimal flow rate of the coolant.

The parameters may be associated with one of two categories: engine parameter and environment parameter. The engine parameter is indicative of a quantity of heat generated by the rotary engine 10 while the environment parameter is indicative of a quantity of heat the heat exchanger 64 is able to transfer to the heat-transfer medium. The engine parameter may be one or more of a torque generated by the rotary engine 10, a power generated by the rotary engine 10, a rotational speed of the rotor of the rotary engine 10, a power level of the engine, and a flow rate of fuel injected in a combustion chamber of the rotary engine 10. The environment parameter is one or more of a pressure of air in an environment outside the rotary engine, a temperature of the air, a humidity of the air, a speed of travel of an aircraft equipped with the rotary engine, and a temperature of a lubricant exiting the housings of the rotary engine.

One or more sensor(s) 71 may be used to determine the afore-listed engine and environment parameters. The one or more sensor(s) 71 may include a temperature sensor generating a signal indicative of a temperature of the air of the environment, a pressure sensor generating a signal indicative of a pressure of the air of the environment, a hygrometer generating a signal indicative of a humidity of the air of the environment, an altimeter generating a signal indicative of an altitude of an aircraft equipped with the rotary engine 10 to determine an approximation of the temperature of the air, a torque sensor generating a signal indicative of a torque generated by the rotary engine 10, a power sensor generating a signal indicative of a power generated by the rotary engine 10, a flow sensor generating a signal indicative of a fuel flow rate of a fuel flowing to the rotary engine 10 and being used for combustion, a speed sensor generating a signal indicative of a rotational speed of a crankshaft of the rotary engine 10, and a position sensor generating a signal indicative of a position of a power level within a cockpit of the aircraft, an aircraft speed sensor generating a signal indicative of a speed of travel of the aircraft, and a lubricant temperature sensor generating a signal indicative of a temperature of a lubricant flowing within the rotary engine 10 may be used.

Once the controller 70 has determined the appropriate flow rate of coolant, the controller 70 may cause this coolant to flow towards the coolant passages at that flow rate. This may be achieved by one or more of varying a rotational speed of the pump 62, and changing a flow circulating area of the valve 63. When more coolant is desired, the rotational speed of the pump 62 may be increased and/or the flow circulating area of the valve 63 may be increased.

In some cases, some housings have coolant requirements being inferior to that of some other of the housings. Moreover, as shown in FIGS. 1B and 2, different coolant passages within the same housing may have different coolant requirements. For instance, the side housings 11, typically located at axial extremities of the engine stack, may require less coolant since they have one side exposed to air within a nacelle or other structure containing the rotary engine 10. Also, a coolant passage of one of the housings proximate where the combustion occurs may have a greater cooling requirement of another coolant passage of that same housing. Also, the rotor housings 18 and the intermediate housing(s) 19, by being each sandwiched between two others of the housings, may require more coolant. Moreover, the rotary engine 10 may be located closer or further away from cold or hot components, which may vary cooling requirements of some of the housings. For instance, one of the housings may be proximate a cold wall that separates a volume of the nacelle containing the rotary engine 10 from the environment. Hence, the housing proximate the cold wall may not require as much coolant as another housing located further away from this cold wall. The implementation of the rotary engine 10 within an aircraft may thus cause discrepancies in cooling requirements of the different housings.

Therefore, it may not be optimal to equally divide the flow rate of coolant between the housings, and between each of the coolant passages. To adequately split the flow rate of the coolant, fixed orifices 66 may be used. The fixed orifices may define a specific flow circulating area selected to ensure a proper split of the flow rate of the coolant between the different housings and coolant passages. The fixed orifice 66 fluidly connected to one of the side housings 11 may have a flow circulating area selected for decreasing a local flow rate of the coolant flowing through the coolant passage of that housing since the side housing 11 may have a cooling requirement lower than an average of cooling requirements of the housings. Put differently, a flow circulating area of the fixed orifice 66 associated to the side housings 11 may be smaller than that of the fixed orifice 66 associated to the rotor housings 18 and the intermediate housing(s) 19. In some cases, some of the lines that are connected to the housings may be devoid of a fixed orifice since it may not be required to restrict the flow. The fixed orifices 66 are depicted as being located upstream of the housings, but may alternatively be located downstream thereof. The dimension of those fixed orifices 66 may be computed based on a plurality of test (e.g., experimental testing, numerical simulations, etc.) performed on the rotary engine 10. In some embodiments, return lines may be used to flow excess coolant from the fixed orifices 66 back to the source of coolant S.

Figure 4:
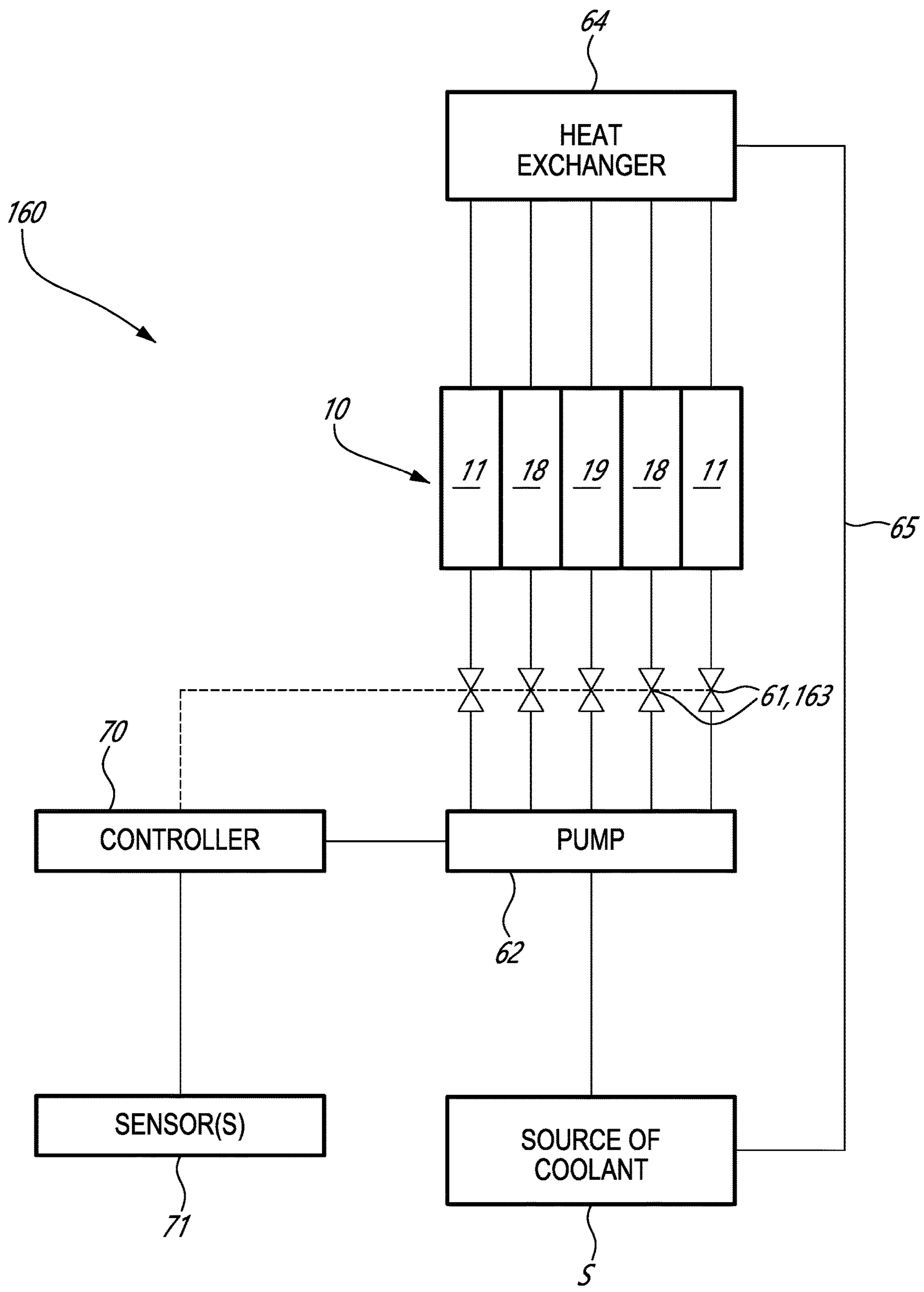
FIG. 4 is a schematic view of a rotary engine and cooling system thereof in accordance with another embodiment.

Referring now to FIG. 4, another embodiment of a cooling system is shown at 160. For the sake of conciseness, only features differing from the cooling system 60 of FIG. 3 are described below.

In the embodiment shown, a plurality of valves 163 may be used to control the flow rate of the coolant through each of the housings and coolant passages. These valves 163 may be actuated valves operatively connected to the controller 70 which is configured to adjust flow circulating areas defined by the valves 163. Although only one valve per housing is shown, more or less valves may be used. For instance, two valves may be used for each of the coolant passages of a single housing. Also, housings expected to have the same cooling requirement may be fluidly connected to the same common valve. Any configurations are contemplated.

In this embodiment, the pump 62 is drivingly engaged by a crankshaft of the rotary engine 10. Thus, it may not be possible to control its rotational speed. The variation of the flow rate of the coolant may thus be achieved by the controlling of the flow circulating areas of the valves 163. However, alternatively, the controller 70 may control the rotational speed of the pump 62 and the control of the flow rate of the coolant may be achieved via both of the pump 62 and the valves 163.

Although not illustrated, fixed orifices 66 as described above with reference to FIG. 3 may be used to provide an optimal split of the coolant throughout the different coolant passages. However, this function may be carried by the valves 163 themselves. For instance, each of the valves 163 may be associated with a respective offset. Thus, if the controller 70 triggers the valves 163 to be opened at 50%, the valves 163 associated with the side housings 11, which may have a lower cooling requirement, may be attributed an offset of, for instance −5%, such that instead of opening at 50%, the valves 163 associated with the side housings are opened at 45% since we typically want less coolant through these housings. It follows that the valve 163 of the intermediate housing 19 may be associated with an offset of +5% such that it opens at 55% instead of 50% to accommodate more coolant. The example above is provided for illustrative purposes and is not intended to be so limiting. Other percentages and offsets are contemplated herein.

It will be appreciated that pressure drops through the different coolant passages may vary from coolant passage to coolant passage because of their respective flow circulating area, shape, length, and so on. It may be required to compute the pressure drops associated with the different coolant passages in order to adequately compute the offset of the valves and/or to adequately compute the flow circulating areas of the fixed orifices 66.

Referring now to FIG. 5, a lookup table is shown at 500 and is used to correlate engine parameter data 501 and environment parameter data 502 to flow rate data 503. The lookup table 500 may be generated via experimental testing and/or via numerical testing (e.g., computational fluid dynamics) of the rotary engine 10 and of its coolant passages. For each combination of engine parameter(s) and environment parameter(s), the lookup table 500 may return a corresponding flow rate that may optimizes the cooling of the rotary engine 10. The lookup table 500 may be filled during a testing phase of the rotary engine 10 and may be hard-coded into the controller 70. Alternatively, the lookup table 500 may be uploaded in a cloud to which the controller 70 may connect to via any known communication protocols. The lookup table 500 may thus be periodically updated based on data gathered from all aircraft of a fleet.

Figure 6:
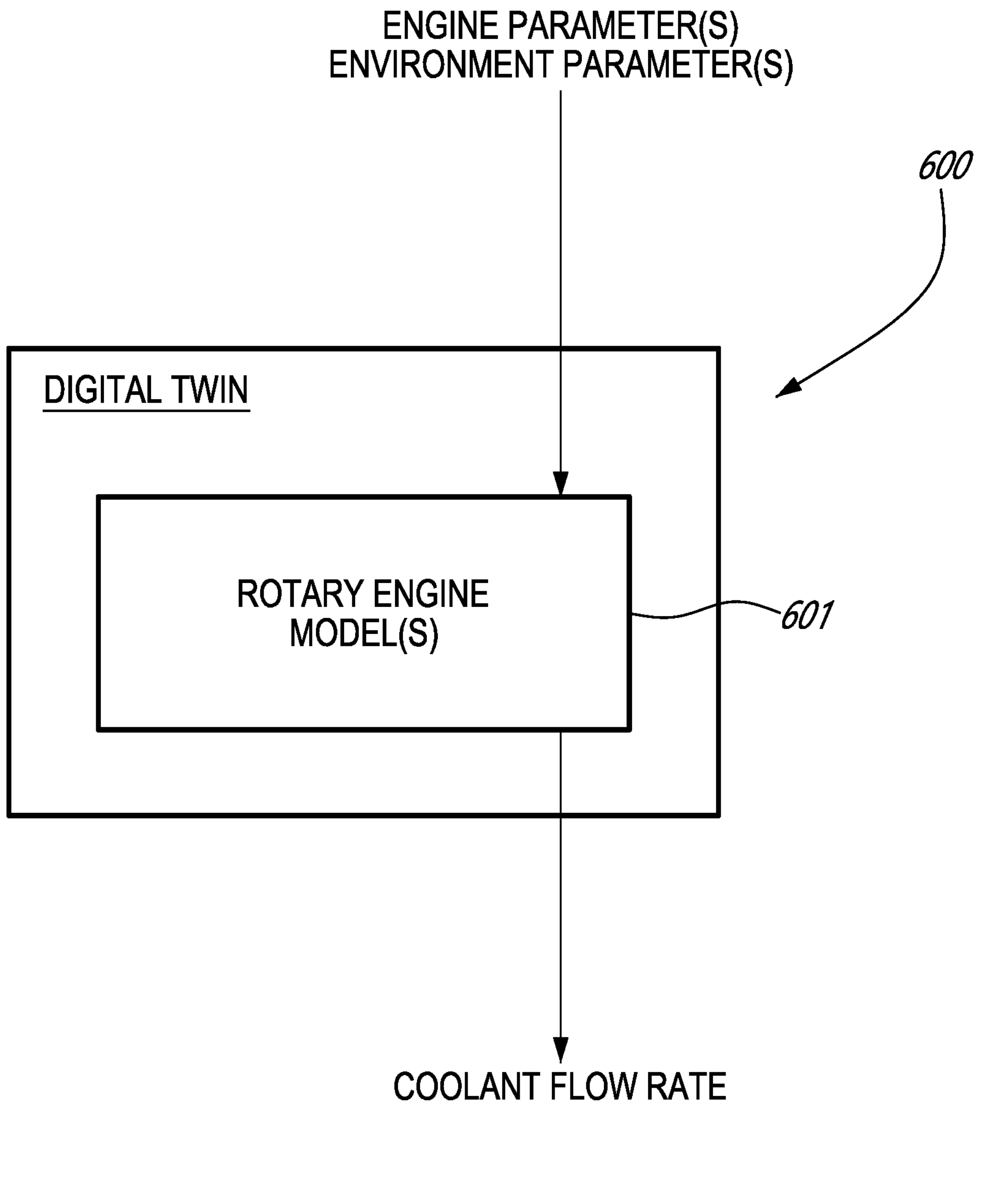
FIG. 6 is a schematic representation of a digital twin of the rotary engine of FIG. 1A.

Referring now to FIG. 6, in another embodiment, the controller 70 may include a digital twin 600 of the rotary engine 10. The digital twin 600 may encompass models 601 of the rotary engine 10 configured to simulate performance and other characteristics of the rotary engine 10. The models 601 may be fed with the engine parameter(s) and the environment parameter(s) and is configured to compute the flow rate of the coolant based on these parameters.

A digital twin of an engine refers to a model of the rotary engine in a digital realm. This model may include a comprehensive and dynamic representation that mirrors the behavior, characteristics, and condition of the actual rotary engine in real-time. It incorporates data from simulations performed on the physical engine and other sources to simulate a performance and behavior of the rotary engine. The digital model of the rotary engine may be created using a plurality of algorithms to simulate the behavior of the physical rotary engine. The algorithms used may include, for instance, physics-based modeling and/or machine learning analytics. The physics-based modeling may include, for instance, finite element analysis and computational fluid dynamics. The machine learning analytics may include, for instance, regression analysis, neural networks, and so on.

Figure 7:
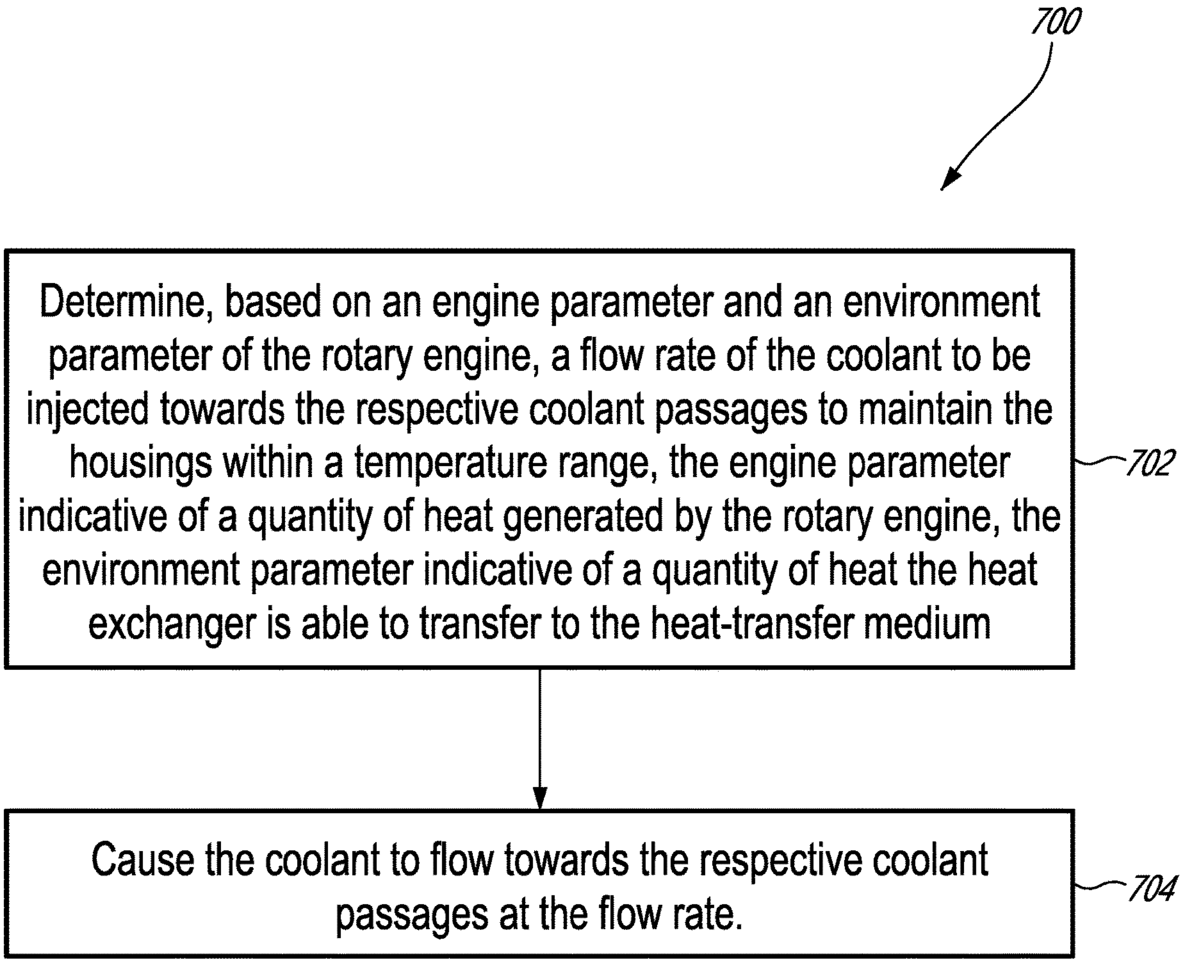
FIG. 7 is a flowchart illustrating steps of a method of mitigating heat generation in the rotary engine of FIG. 1A.

Referring now to FIG. 7, a method for mitigating heat generated by the rotary engine 10 is shown at 700.

The method 700 includes determining, based on the engine parameter and the environment parameter of the rotary engine 10, a flow rate of the coolant to be injected towards the respective coolant passages to maintain the housings within a temperature range, the engine parameter indicative of a quantity of heat generated by the rotary engine, the environment parameter indicative of a quantity of heat the heat exchanger is able to transfer to the heat-transfer medium at 702; and causing the coolant to flow towards the respective coolant passages at the flow rate at 704.

In the embodiment shown, the determining of the flow rate of the coolant based on the engine parameter at 702 includes determining the rate of the flow of the coolant based on one or more of a torque generated by the rotary engine, a power generated by the rotary engine, a rotational speed of a rotor of the rotary engine, and a flow rate of fuel injected in a combustion chamber of the rotary engine. The determining of the flow rate of the coolant based on the environment parameter at 702 includes determining the flow rate of the coolant based on one or more of a pressure of air in an environment outside the rotary engine, a temperature of the air, a speed of travel of an aircraft equipped with the rotary engine, and a temperature of a lubricant exiting the housings of the rotary engine.

The causing of the coolant to flow towards the respective coolant passages at 704 may include varying a rotational speed of the pump 62 driving the flow of the coolant. Alternatively, or in combination, the causing of the coolant to flow towards the respective coolant passages at 704 may include changing the flow circulating area of the 63 valve being in fluid flow communication with the respective coolant passages. The changing of the flow circulating area may include changing the flow circulating area of a single valve being in fluid communication with all of the respective coolant passages. The changing of the flow circulating area may include changing the flow circulating area of a plurality of valves 163 each being in fluid communication with a respective one of the respective coolant passages.

As shown in FIG. 5, the determining of the flow rate of the coolant at 702 may include determining the rate from the lookup table 500 comprising the flow rate data 503 as a function of engine parameter data 501 and environment data 502.

As shown in FIG. 6, the determining of the flow rate of the coolant at 702 may include: feeding the engine parameter and the environment parameter to the digital twin 600 of the rotary engine, the digital twin comprising models 601 of the rotary engine 10; and computing, with the digital twin 600, the rate of the coolant.

In some embodiments, before the determining of the flow rate of the coolant at 702, the method 700 may include determining a coolant distribution scheme. The causing the coolant to flow towards the respective coolant passages at the flow rate at 704 may include dividing the flow rate of the coolant between the housings per the coolant distribution scheme such that a greater portion of the flow rate of the coolant flows through to a subset of the housings having a greater cooling need than a remainder of the housings.

The disclosed cooling systems and method may allow the controller 70 to compute the flow rate of the coolant without the need for temperature sensors and the associate wiring. The flow regulating device(s) may be commanded based on: feedback position, pressure, engine speed, engine torque, engine power, desired speed/torque/power target. The aforementioned inputs can be used the synthesize the coolant temperature based on the engine's efficiency which is established during development.

Figure 8:
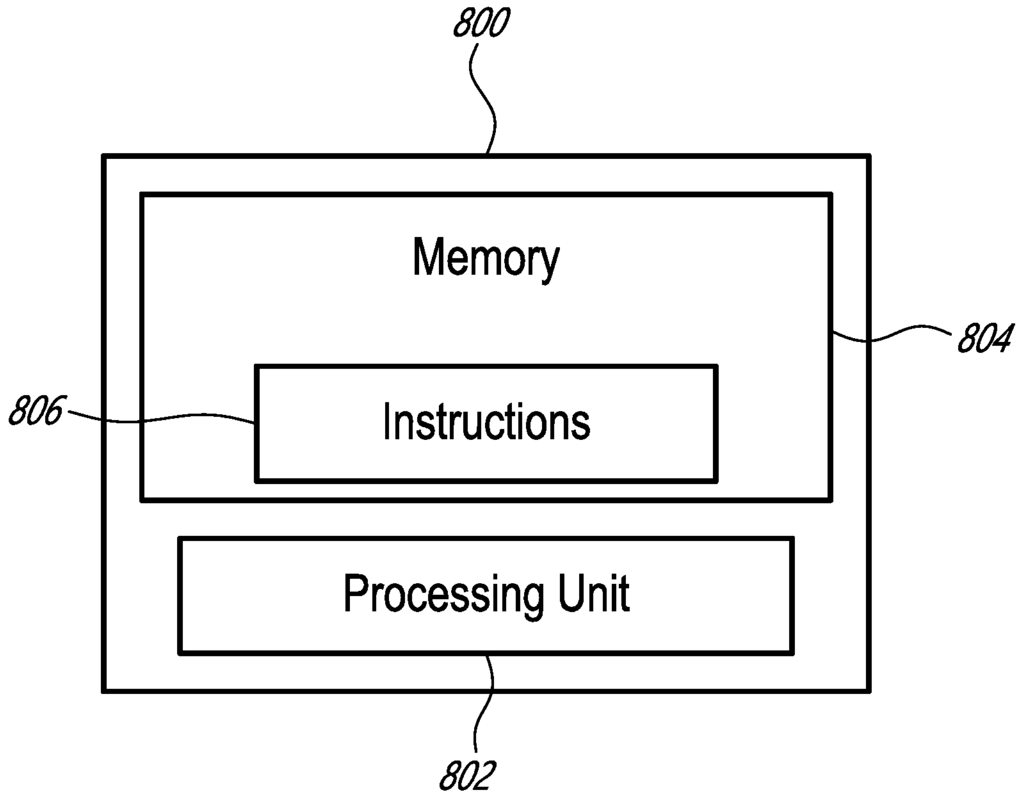
FIG. 8 is a schematic representation of a controller.

With reference to FIG. 8, an example of a computing device 800 is illustrated. For simplicity only one computing device 800 is shown but the system may include more computing devices 800 operable to exchange data. The computing devices 800 may be the same or different types of devices. The controller 70 may be implemented with one or more computing devices 800. Note that the controller 70 can be implemented as part of a full-authority digital engine control (FADEC) system or other similar device, including electronic engine control (EEC), engine control unit (ECU), electronic propeller control, propeller control unit, and the like. In some embodiments, the controller 70 is implemented as a Flight Data Acquisition Storage and Transmission system, such as a FAST™ system. The controller 70 may be implemented in part in the FAST™ system and in part in the EEC. Other embodiments may also apply.

The computing device 800 comprises a processing unit 802 and a memory 804 which has stored therein computer-executable instructions 806. The processing unit 802 may comprise any suitable devices configured to implement the method 700 such that instructions 806, when executed by the computing device 800 or other programmable apparatus, may cause the functions/acts/steps performed as part of the method 700 as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems for mitigating heat generated by a rotary engine described herein may be implemented in a high level procedural or object oriented programming or scripting language, or a combination thereof, to communicate with or assist in the operation of a computer system, for example the computing device 800. Alternatively, the methods and systems for mitigating heat generated by a rotary engine may be implemented in assembly or machine language. The language may be a compiled or interpreted language. Program code for implementing the methods and systems for mitigating heat generated by a rotary engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for mitigating heat generated by a rotary engine may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the method 700.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotary engine, comprising:
- housings secured to one another and conjointly defining a rotor cavity, the housings defining respective coolant passages fluidly connected in parallel to a source of coolant;
- a rotor rotationally received within the rotor cavity; and
- a cooling system including:
  - a flow regulating device in fluid communication with the respective coolant passages;
  - a heat exchanger facilitating heat exchange between the coolant and a heat-transfer medium; and
  - a controller operatively connected to the flow regulating device, the controller having a processing unit operatively connected to a computer-readable medium having instructions stored thereon and executable by the processing unit to:

- determine, based on an engine parameter and an environment parameter of the rotary engine, a flow rate of the coolant to be injected towards the respective coolant passages to maintain the housings within a temperature range, the engine parameter indicative of a quantity of heat generated by the rotary engine, the environment parameter indicative of a quantity of heat the heat exchanger is able to transfer to the heat-transfer medium; and
    - cause the coolant to flow towards the respective coolant passages at the flow rate.

2. The rotary engine of claim 1, wherein the engine parameter is one or more of a torque generated by the rotary engine, a power generated by the rotary engine, a rotational speed of the rotor of the rotary engine, and a flow rate of fuel injected in a combustion chamber of the rotary engine.

3. The rotary engine of claim 1, wherein the environment parameter is one or more of a pressure of air in an environment outside the rotary engine, a humidity of the air, a temperature of the air, a speed of travel of an aircraft equipped with the rotary engine, and a temperature of a lubricant exiting the housings of the rotary engine.

4. The rotary engine of claim 1, wherein the flow regulating device is a pump, the computer-readable medium has the instructions executable by the processing unit to inject the flow of the coolant towards the respective coolant passages by varying a rotational speed of the pump.

5. The rotary engine of claim 1, wherein the flow regulating device is a valve, the computer-readable medium has the instructions executable by the processing unit to inject the flow of the coolant towards the respective coolant passages by changing a flow circulating area of the valve.

6. The rotary engine of claim 1, wherein the computer-readable medium has the instructions executable by the processing unit to determine the flow rate of the coolant by determining the flow rate from a lookup table comprising flow rate data as a function of engine parameter data and environment data.

7. The rotary engine of claim 1, wherein the computer-readable medium has the instructions executable by the processing unit to determine the flow rate of the coolant by:
- feeding the engine parameter and the environment parameter into a digital twin of the rotary engine, the digital twin comprising a model of the rotary engine; and
- computing, with the digital twin, the flow rate of the rotary engine.

8. The rotary engine of claim 1, comprising a fixed orifice in fluid communication with one of the respective coolant passages, the fixed orifice having a flow circulating area selected for decreasing a local flow rate of the coolant flowing through the one of the respective coolant passages, the one of the respective coolant passages being associated with one of the housings having a cooling requirement lower than an average of cooling requirements of the housings.

9. The rotary engine of claim 1, comprising flow paths extending through the housings, the flow paths including a first flow path extending within a first side housing coolant passage of a first side housing of the housings, a second flow path extending within a second side housing coolant passage of a second side housing of the housings, and a third flow path extending within a rotor housing coolant passage of a rotor housing of the housings, the flow paths free from intersection with one another.

10. The rotary engine of claim 9, wherein the flow paths are free from intersection with mounting interfaces between the housings.

11. A method for mitigating heat generated by a rotary engine, the rotary engine having housings defining respective coolant passages for flowing a coolant, the coolant in heat exchange relationship with a heat-transfer medium via a heat-exchanger, the method comprising:

determining, based on an engine parameter and an environment parameter of the rotary engine, a flow rate of the coolant to be injected towards the respective coolant passages to maintain the housings within a temperature range, the engine parameter indicative of a quantity of heat generated by the rotary engine, the environment parameter indicative of a quantity of heat the heat exchanger is able to transfer to the heat-transfer medium; and causing the coolant to flow towards the respective coolant passages at the flow rate.

12. The method of claim 11, wherein the determining of the flow rate of the coolant based on the engine parameter includes determining the flow rate of the coolant based on one or more of a torque generated by the rotary engine, a power generated by the rotary engine, a rotational speed of a rotor of the rotary engine, and a flow rate of fuel injected in a combustion chamber of the rotary engine.

13. The method of claim 11, wherein the determining of the flow rate of the coolant based on the environment parameter includes determining the flow rate of the coolant based on one or more of a pressure of air in an environment outside the rotary engine, a humidity of the air, a temperature of the air, a speed of travel of an aircraft equipped with the rotary engine, and a temperature of a lubricant exiting the housings of the rotary engine.

14. The method of claim 11, wherein the causing of the coolant to flow towards the respective coolant passages includes varying a rotational speed of a pump driving the flow of the coolant.

15. The method of claim 11, wherein the causing of the coolant to flow towards the respective coolant passages includes changing a flow circulating area of a valve being in fluid flow communication with the respective coolant passages.

16. The method of claim 15, wherein the changing of the flow circulating area includes changing the flow circulating area of a single valve being in fluid communication with each of the respective coolant passages.

17. The method of claim 15, wherein the changing of the flow circulating area includes changing the flow circulating area of a plurality of valves each being in fluid communication with a respective one of the respective coolant passages.

18. The method of claim 11, wherein the determining of the flow rate of the coolant includes determining the flow rate from a lookup table comprising flow rate data as a function of engine parameter data and environment data.

19. The method of claim 11, wherein the determining of the flow rate of the coolant includes:

feeding the engine parameter and the environment parameter into a digital twin of the rotary engine, the digital twin comprising a model of the rotary engine; and computing, with the digital twin, the flow rate of the coolant.

20. The method of claim 11, comprising, before the determining of the flow rate of the coolant, determining a coolant distribution scheme, wherein the causing the coolant to flow towards the respective coolant passages at the flow rate includes dividing the flow rate of the coolant between the housings per the coolant distribution scheme such that a greater portion of the flow rate of the coolant flows through to a subset of the housings having a greater cooling need than a remainder of the housings.

* * * * *